Nov. 6, 1951  F. W. SAMPSON  2,574,294
WINDSHIELD WIPER
Filed Nov. 15, 1945
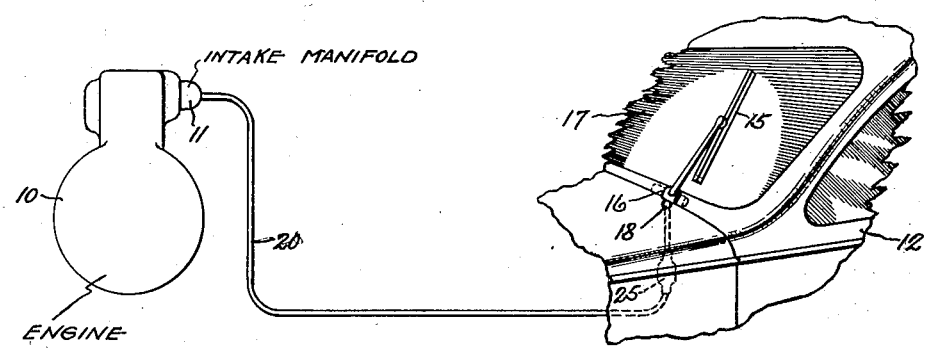
Fig. 1
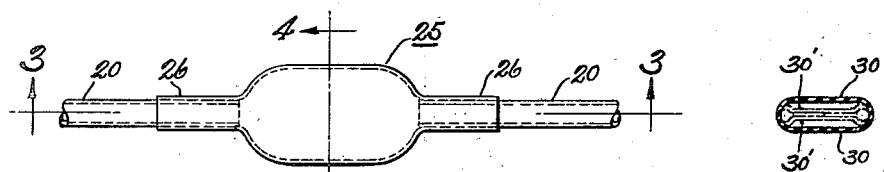
Fig. 2
Fig. 4
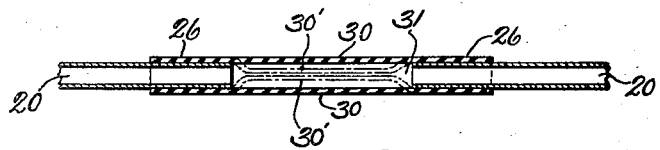
Fig. 3
INVENTOR
Frederick W. Sampson
BY
Spencer Hardman & Fehr
his ATTORNEYS Patented Nov. 6, 1951

2,574,294

UNITED STATES PATENT OFFICE 2,574,294

WINDSHIELD WIPER

Frederick W. Sampson, Dayton, Ohio, assignor to General Motors Corporation, Detroit, Mich., a corporation of Delaware Application November 15, 1945, Serial No. 628,867

2 Claims. (Cl. 15—253)

1

This invention relates to windshield wipers for automotive vehicles and means for controlling same. Various types of vacuum motors are now used on automotive vehicles for operating windshield wipers, and are connected by a small duct to the intake manifold of the vehicle engine so that the engine-created vacuum in said intake manifold supplies the power for operating same. It is well known that the degree of vacuum in such intake manifolds varies very widely due to changes in the speed and load on the engine and the degree of opening of the main throttle valve and perhaps other factors. Such changes in the degree of partial vacuum commonly causes the wiper blade to move too fast at times and too slow at other times and often to stop temporarily when the main throttle is opened wide to overcome an increased load on the engine. It so happens that the intake manifold vacuum is usually at a minimum or too small to provide effective wiper action at the very time that good wiper action is most needed, i. e. when the automobile engine is laboring with open throttle. It is possible to provide a more powerful vacuum motor which will operate at the desired speed when the intake manifold vacuum is at or near its minimum, however when this is done the excess power causes the vacuum motor to work too fast as soon as the intake vacuum approaches more normal values. Therefore frequent manual adjustment of present day equipment is necessary to properly control the speed of the wiper blade.

An object of this invention is to provide a combination of devices for providing good windshield wiper action without the necessity of such manual adjustment.

Another object is to provide means for automatically controlling the air flow drawn from the vacuum motor so that as the vacuum in the intake manifold varies widely the windshield wiper will still operate without great variation in speed.

Another object is to provide a simple and efficient control means for accomplishing the above result.

Further objects and advantages of the present invention will be apparent from the following description, reference being had to the accompanying drawings wherein a preferred embodiment of the present invention is clearly shown.

In the drawings;

Fig. 1 is a diagrammatic view illustrating the general arrangement of the combination.

Figs. 2, 3 and 4 are detail views of one form of unitary vacuum control means suitable for use in the combination of this invention.

Fig. 2 is a plan view of a small collapsible bag and its connections to the vacuum duct.

Fig. 3 is a longitudinal section on line 3—3 of Fig. 2.

Fig. 4 is a cross section taken on line 4—4 of Fig. 2.

In Fig. 1 the automobile engine 10 and its intake manifold 11 are shown diagrammatically. An automobile 12 is shown with its windshield wiper 15 and an oscillating vacuum operated motor 16 mounted at the customary location adjacent one edge of the windshield 17. The vacuum duct 20 leads from intake manifold 11 to the vacuum motor 16, by means of which a pressure differential between the manifold vacuum and atmospheric pressure is applied to the working piston or pistons of the vacuum motor and supplies the necessary power for operating same. A manual control valve 18, ordinarily built as an integral part of the vacuum motor, serves to shut off the vacuum duct and stop the operation of the windshield wiper when it is not needed. Duct 20 is commonly a small metal tube which can readily be bent to take any desired course from intake manifold 11 to vacuum motor 16 so that it will not interfere with other parts of the automobile. So much of this disclosure is now well known and hence has been illustrated in the drawings only diagrammatically.

Now according to this invention the vacuum motor 16 is made sufficiently large and powerful to operate effectively when the minimum vacuum occurs in intake manifold 11 and in order to counteract such abundance of power an automatic flow-restricting means 25 is provided in duct 20 to limit the speed of the vacuum motor at other times. Thus the windshield wiper will not become too slow or stop when the manifold vacuum is at or near its minimum and will operate at a regulated speed regardless of wide variations in the degree of vacuum in the intake manifold. The rate at which the volume of air passing thru motor 16 is drawn thru duct 20 will correspond approximately to the number of strokes per minute of the vacuum motor, hence the automatic flow-restricting means which controls the air flow in duct 20 will control the speed of the vacuum motor.

As one form of a suitable automatic flow-restricting means I have chosen for illustrative purposes the collapsible flat-section flexible rubber bag 25 shown in Figs. 2, 3 and 4. Bag 25 is molded in one piece with a tubular extension 26 at each end of such diameter as to fit snugly over the inserted ends of the metal tube 20, as clearly shown. In Fig. 1 the size of this bag 25 is shown somewhat enlarged for the sake of clarity. Typical dimensions of the collapsible portion of bag 25 for use with passenger automobiles are about 1¼ inches long by ¾ inch wide by $\frac{3}{16}$ inch deep, although of course these dimensions may be varied widely to suit the requirements of different conditions.

In operation, the resilient flat walls 30 of the air chamber 31 of the bag 25 will yield progressively inwardly as indicated by the dotted lines 30' due to the pressure differential between the outside atmosphere and the varying vacuum in chamber 31 to progressively restrict the air flow from the vacuum motor as the vacuum in the intake manifold increases to such extent that the windshield wiper tends to operate too fast. When the operating vacuum in the intake manifold is relatively small, that is at or near its minimum, walls 30 will move further apart due to their inherent tendency to spring back to their original position and thereby provide an unrestricted passage thru bag 30 at least as large as that thru duct 20.

According to this invention the vacuum motor used in this combination has an effective piston area considerably larger than is customary in such devices, that is, the piston area is large enough so that the vacuum motor will operate and provide good wiper action when the intake manifold vacuum is at its minimum. Hence when the intake manifold vacuum increases due to more normal conditions affecting same such a vacuum motor would immediately operate too fast unless some sort of speed control is provided. The flow-restricting means of this invention automatically regulates the air flow thru duct 20 and so causes a substantially constant speed of the windshield wiper under widely varying conditions of driving.

It is to be understood that the specific form of the flow-restricting means shown and described herein is not critical in the combination claimed.

What I claim is as follows:

1. In a windshield wiper installation for an automobile including: a windshield wiper, a vacuum operated wiper motor, an internal combustion engine having an intake manifold subjected to vacuum conditions, and a conduit connecting said motor to said manifold, the combination with said conduit of means for limiting the degree of vacuum applied to said motor, comprising a chamber in said conduit having oppositely positioned flat walls of resilient material located in spaced relation to permit unrestricted flow of air through said conduit under low vacuum conditions, but collapsible to decrease the space between said walls and restrict the flow of air through said conduit as said manifold vacuum is increased to thereby limit the vacuum applied to said motor to substantially that corresponding to the lowest vacuum occurring in said manifold during normal operation of said engine.

2. In combination, an automotive vehicle having an engine and intake manifold therefor, a windshield wiper motor operated by a widely varying partial vacuum in said intake manifold, said motor having a working piston of such large effective area that it will drive the wiper with the minimum vacuum occurring in said manifold during normal operating conditions, said motor having such an excess of power when subjected to high vacuum that it will drive the wiper at excessive speed during high manifold vacuum conditions, and means responsive to degree of manifold vacuum for progressively restricting the flow of air from said motor to said manifold at all times except when the partial vacuum in said manifold is at its minimum operating value, said last mentioned means including a chamber of resilient material in the conduit between the vacuum motor and the manifold, said chamber in its uncollapsed state normally offering no resistance to the flow of air therethrough, but collapsible on increase in vacuum within said conduit to restrict the flow therethrough to thereby limit the degree of vacuum applied to said motor to that magnitude occurring in said manifold under low vacuum conditions.

FREDERICK W. SAMPSON.

REFERENCES CITED

The following references are of record in the file of this patent:

UNITED STATES PATENTS

| Number | Name | Date |
|---|---|---|
| 1,738,545 | Weber | Dec. 10, 1929 |
| 1,797,977 | Folberth et al. | Mar. 24, 1931 |
| 1,845,969 | Hueber | Feb. 16, 1932 |
| 1,966,493 | Fleming | July 17, 1934 |
| 2,276,911 | Alward | Mar. 17, 1942 |
| 2,467,150 | Nordell | Apr. 12, 1949 |

FOREIGN PATENTS

| Number | Country | Date |
|---|---|---|
| 622,473 | France | May 31, 1927 |